United States Patent
Crawford et al.

(10) Patent No.: US 11,455,599 B2
(45) Date of Patent: Sep. 27, 2022

(54) SYSTEMS AND METHODS FOR IMPROVED MEETING ENGAGEMENT

(71) Applicant: Educational Measures, LLC, Greenwood Village, CO (US)

(72) Inventors: Marc William Crawford, Greenwood Village, CO (US); Steve James Konieczka, Greenwood Village, CO (US); Tyler Paul Nelson, Greenwood Village, CO (US); Cynthia Kiyoko Bakewell, Greenwood Village, CO (US); Justin Michael Pohlmann, Greenwood Village, CO (US)

(73) Assignee: Educational Measures, LLC, Greenwood Village, CO (US)

( * ) Notice: Subject to any disclaimer, the term of this patent is extended or adjusted under 35 U.S.C. 154(b) by 0 days.

(21) Appl. No.: 16/715,551

(22) Filed: Dec. 16, 2019

(65) Prior Publication Data
US 2020/0320478 A1 Oct. 8, 2020

Related U.S. Application Data

(60) Provisional application No. 62/828,158, filed on Apr. 2, 2019.

(51) Int. Cl.
*G06Q 10/00* (2012.01)
*G06Q 10/10* (2012.01)
(Continued)

(52) U.S. Cl.
CPC ......... *G06Q 10/10* (2013.01); *H04L 65/1066* (2013.01); *H04L 67/55* (2022.05)

(58) Field of Classification Search
CPC ..... G06Q 10/10; H04L 65/1066; H04L 67/26; H04L 65/403
See application file for complete search history.

(56) References Cited

U.S. PATENT DOCUMENTS 8,670,018 B2 * 3/2014 Cunnington ........... G06Q 10/10
348/14.08
9,843,768 B1 12/2017 Negi et al.
(Continued)

OTHER PUBLICATIONS

A. Plaue, Christopher Michael. "Exploring and Visualizing the Impact of Multiple Shared Displays on Collocated Meeting Practices". Georgia Institute of Technology. Aug. 2009.*
(Continued)

*Primary Examiner* — Gabrielle A McCormick
(74) *Attorney, Agent, or Firm* — DLA Piper LLP (US)

(57) ABSTRACT

In some embodiments, the systems and methods built in accordance with the present disclosure may analyze audience engagement with a presentation displayed during a live meeting and may provide feedback to a presenter during and/or after the presentation. In some embodiments, the provided feedback may include determining one or more metrics indicative of participant engagement levels. Participant engagement levels may then be used to adjust live meetings in real-time and/or after the live meeting has ended. A system may include one or more presenter computing devices, one or more participant computing devices and a server system including a data analytics module configured to determine metrics indicative of participant engagement levels.

20 Claims, 9 Drawing Sheets

(51) Int. Cl.
  *H04L 65/1066* (2022.01)
  *H04L 67/55* (2022.01)

(56) References Cited

U.S. PATENT DOCUMENTS

| | | | |
|---|---|---|---|
| 9,953,029 B2 | 4/2018 | Baughman et al. | |
| 10,325,291 B2* | 6/2019 | Ge | G06Q 30/0269 |
| 2004/0255232 A1 | 12/2004 | Benediktson et al. | |
| 2008/0320082 A1* | 12/2008 | Kuhlke | H04L 12/1822 |
| | | | 709/205 |
| 2009/0070798 A1* | 3/2009 | Lee | A61B 5/1113 |
| | | | 725/10 |
| 2009/0241033 A1* | 9/2009 | Mujtaba | G09B 5/12 |
| | | | 715/752 |
| 2010/0332959 A1 | 12/2010 | Mitchell et al. | |
| 2012/0007794 A1* | 1/2012 | Bansal | H04L 65/1086 |
| | | | 345/2.1 |
| 2012/0197991 A1 | 8/2012 | Ramani et al. | |
| 2013/0227420 A1 | 8/2013 | Pasquero et al. | |
| 2014/0137144 A1 | 5/2014 | Jarvenpaa | |
| 2014/0176665 A1* | 6/2014 | Gottlieb | H04L 65/403 |
| | | | 709/204 |
| 2014/0282049 A1* | 9/2014 | Lyon | G06F 3/0484 |
| | | | 715/744 |
| 2015/0082194 A1 | 3/2015 | Rai | |
| 2015/0121246 A1 | 4/2015 | Cunha et al. | |
| 2015/0154291 A1 | 6/2015 | Shepard et al. | |
| 2016/0011729 A1* | 1/2016 | Flores | G06F 3/167 |
| | | | 715/728 |
| 2016/0049094 A1* | 2/2016 | Gupta | G09B 9/00 |
| | | | 434/185 |
| 2016/0063883 A1* | 3/2016 | Jeyanandarajan | H04L 67/22 |
| | | | 434/201 |
| 2016/0073054 A1 | 3/2016 | Balasaygun et al. | |
| 2016/0110669 A1 | 4/2016 | Iyer | |
| 2017/0127021 A1* | 5/2017 | Frank | G06K 9/6293 |
| 2017/0147154 A1 | 5/2017 | Charbonneau et al. | |
| 2017/0169727 A1 | 6/2017 | Briggs et al. | |
| 2017/0295404 A1 | 10/2017 | Meredith et al. | |
| 2018/0007150 A1* | 1/2018 | Deopura | H04W 4/23 |
| 2018/0124359 A1 | 5/2018 | Faulkner | |
| 2018/0145840 A1 | 5/2018 | Advani et al. | |
| 2018/0343491 A1* | 11/2018 | Loheide | G06Q 30/0633 |
| 2019/0361926 A1 | 11/2019 | Rogynskyy et al. | |
| 2019/0378164 A1* | 12/2019 | Eich | H04N 21/4532 |
| 2020/0021453 A1* | 1/2020 | Advani | H04L 12/1827 |
| 2020/0193264 A1* | 6/2020 | Zavesky | G06N 20/00 |
| 2020/0210469 A1* | 7/2020 | Van Rensburg | G06F 40/166 |
| 2020/0313919 A1* | 10/2020 | Gurr | H04L 12/1831 |

OTHER PUBLICATIONS

PCT International Application No. PCT/US2020/026157, International Search Report, dated Jun. 11, 2020, 3 pages.

PCT International Application No. PCT/US2020/026157, Written Opinion of The International Searching Authority, dated Jun. 11, 2020, 8 pages.

Mallonee, Sybil; et al. "Training providers in the use of evidence-based treatments: A comparison of in-person and online delivery modes." Psychology Learning & Teaching 17.1: 61-72. Sage Publications Symposion Publishing The Higher Education Academy Psychology Network (Year: 2018).

* cited by examiner

SYSTEMS AND METHODS FOR IMPROVED MEETING ENGAGEMENT

CROSS-REFERENCE TO RELATED APPLICATIONS

This application claims priority to and the benefit of U.S. Provisional Application No. 62/828,158, entitled "SYSTEMS AND METHODS FOR IMPROVED MEETING ENGAGEMENT", filed on Apr. 2, 2019, the contents of which are hereby incorporated by reference in its entirety.

TECHNICAL FIELD

The present disclosure relates to a live meeting platform configured to provide improved meeting engagement.

BACKGROUND

In conventional live meeting environments, a presenter often uses slides to present to an audience. However, the presenters are not always provided with feedback regarding their presentation either (1) during their live presentation, or (2) after the live presentation. Moreover, the presenters are not always able to analyze whether an audience is engaged with the presentation.

SUMMARY

In some embodiments, the systems and methods built in accordance with the present disclosure analyzes audience engagement with a presentation and may provide feedback to a presenter during and/or after the presentation. In some embodiments, the provided feedback may include determining one or more metrics indicative of participant engagement levels. Participant engagement levels may then be used to adjust live meetings in real-time and/or after the live meeting has ended. In some embodiments, feedback may be provided to an organizer of a meeting (who may be different from a presenter).

In some embodiments, a system may include one or more presenter computing devices configured to display a presentation and generate presentation data, one or more participant computing devices configured to generate participant data including one or more participant reactions to the displayed presentation, and a server system including one or more processors and a memory that includes instructions, that when executed by the one or more processors, causes the one or more processors to: receive participant data from the participant computing device of a live meeting environment, receive presentation data from the presenter computing device of the live meeting environment, determine a key metric for the live meeting environment based on at least one of the received participant data and received presentation data, and modify a presentation of the live meeting environment based on at least one determined key metric.

In some embodiments, a method includes receiving, at a server system, participant data from a participant computing device of a live meeting environment, receiving, at a server system, presentation data from a presenter computing device of the live meeting environment, determining one or more key metrics for the live meeting environment based on the received participant data and received presentation data, and modifying a presentation for the live meeting environment based on the determined one or more key metrics.

In some embodiments, a system may include a presenter computing device configured to display a presentation and generate presentation data, a participant computing device configured to generate participant data comprising one or more participant reactions to the displayed presentation, and a server system comprising one or more processors and a memory that includes instructions, that when executed by the one or more processors, causes the one or more processors to: receive participant data from the participant computing device of a live meeting environment; receive presentation data from the presenter computing device of the live meeting environment; determine a key metric for the live meeting environment based on at least one of the received participant data and received presentation data; and modify a presentation of the live meeting environment based at least one the determined key metric. Optionally, the participant data may include at least one of participant engagement data, and participant feedback. Optionally, the presentation data may include at least one of slides associated with the presentation, timing information for when each slide is pushed to a participant computing device, and polling questions. Optionally, key metrics may include at least one of participant engagement levels, participant engagement over time, meeting ratings, popularity of content, key words, total count of participants, top participants based on engagement levels, percentage of participants who engaged with content, percentage of highly engaged participants, total number of actions, actions by action types, response rates to polling questions, response rates to survey questions, percentage of correction questions, experience ratings, counts of actions over time, word cloud, engagement levels by slide, response graphs by questions, participant identification, and participant profiles. Optionally, a participant profile includes at least one of a participant demographic, an indication of the content a participant responded to, or the percentage of questions the participant answered correctly. Optionally, modifications to the presentation of the live meeting environment comprises altering at least one of slide formatting, slide order, slide content, presentation order, and presentation content.

In some embodiments, a method includes the steps of receiving, at a server system, participant data from a participant computing device of a live meeting environment, receiving, at a server system, presentation data from a presenter computing device of the live meeting environment, determining one or more key metrics for the live meeting environment based on the received participant data and received presentation data, and modifying a presentation for the live meeting environment based on the determined one or more key metrics. Optionally, participant data may include at least one of participant engagement data, and participant feedback. Optionally, the presentation data may include at least one of slides associated with the presentation, timing information for when each slide is pushed to a participant computing device, and polling questions. The key metric may include at least one of participant engagement levels, participant engagement over time, meeting ratings, popularity of content, key words, total count of participants, top participants based on engagement levels, percentage of participants who engaged with content, percentage of highly engaged participants, total number of actions, actions by action types, response rates to polling questions, response rates to survey questions, percentage of correction questions, experience ratings, counts of actions over time, word cloud, engagement levels by slide, response graphs by questions, participant identification, and participant profiles. The participant profile may include at least one of a participant demographic, an indication of the content a participant responded to, or the percentage of questions the participant answered correctly. Optionally, modifying the presentation of the live meeting environment may include altering at least one of slide formatting, slide order, slide content, presentation order, and presentation content. Determining one or more key metrics for the live meeting environment may include determining one or more key metrics for a particular slide, determining one or more key metrics across a collection of slides, and comparing at least one of the determined key metrics for a particular slide, and key metrics for across a collection of slides, with a benchmark.

Embodiments of the present disclosure may include a computer program product for improving live meeting engagement. The computer program product may include computer-readable media having computer-readable code for effecting actions in a computing platform such as program code for receiving participant data from a participant computing device of a live meeting environment, program code for receiving presentation data from a presenter computing device of the live meeting environment, program code for determining a key metric for the live meeting environment based on at least one of the received participant data and the received presentation data, and program code for modifying a presentation of the live meeting environment based on at least one determined key metric.

In such an embodiment, the participant data may include at least one of participant engagement data, and participant feedback. Optionally, the presentation data may include at least one of slides associated with the presentation, timing information for when each slide is pushed to a participant computing device, and polling questions. Additionally, the key metric may include at least one of participant engagement levels, participant engagement over time, meeting ratings, popularity of content, key words, total count of participants, top participants based on engagement levels, percentage of participants who engaged with content, percentage of highly engaged participants, total number of actions, actions by action types, response rates to polling questions, response rates to survey questions, percentage of correction questions, experience ratings, counts of actions over time, word cloud, engagement levels by slide, response graphs by questions, participant identification, and participant profiles. Optionally, the participant profile may include at least one of a participant demographic, an indication of the content a participant responded to, or the percentage of questions the participant answered correctly. Further, the program code may also include instructions for modifying the presentation of the live meeting environment by altering at least one of slide formatting, slide order, slide content, presentation order, and presentation content. Additionally, the program code may determine one or more key metrics for the live meeting environment by determining one or more key metrics for a particular slide, determining one or more key metrics across a collection of slides, and comparing at least one of the determined key metrics for a particular slide, and key metrics for across a collection of slides, with a benchmark.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 5A illustrates a view of a platform built in accordance with some embodiments of the present disclosure.

FIG. 5B illustrates a view of a platform built in accordance with some embodiments of the present disclosure.

DETAILED DESCRIPTION

In some embodiments, the systems and methods built in accordance with the present disclosure may analyze audience engagement with a presentation displayed during a live meeting and may provide feedback to a presenter during and/or after the presentation. In some embodiments, the provided feedback may include determining one or more metrics indicative of participant engagement levels. Participant engagement levels may then be used to adjust live meetings in real-time and/or after the live meeting has ended.

In some embodiments, a live meeting environment may include a conference, a workshop, a business meeting, an academic setting, and the like. In some embodiments, the live meeting environment may include conferences for various industries, including, but not limited to, the financial services, pharmaceutical, educational industries and the like.

A participant may refer to an individual viewing a presentation. Examples may include conference participants, students and the like. A presenter may refer to the one or more individuals providing the presentation and/or moderating the live meeting.

Figure 1:
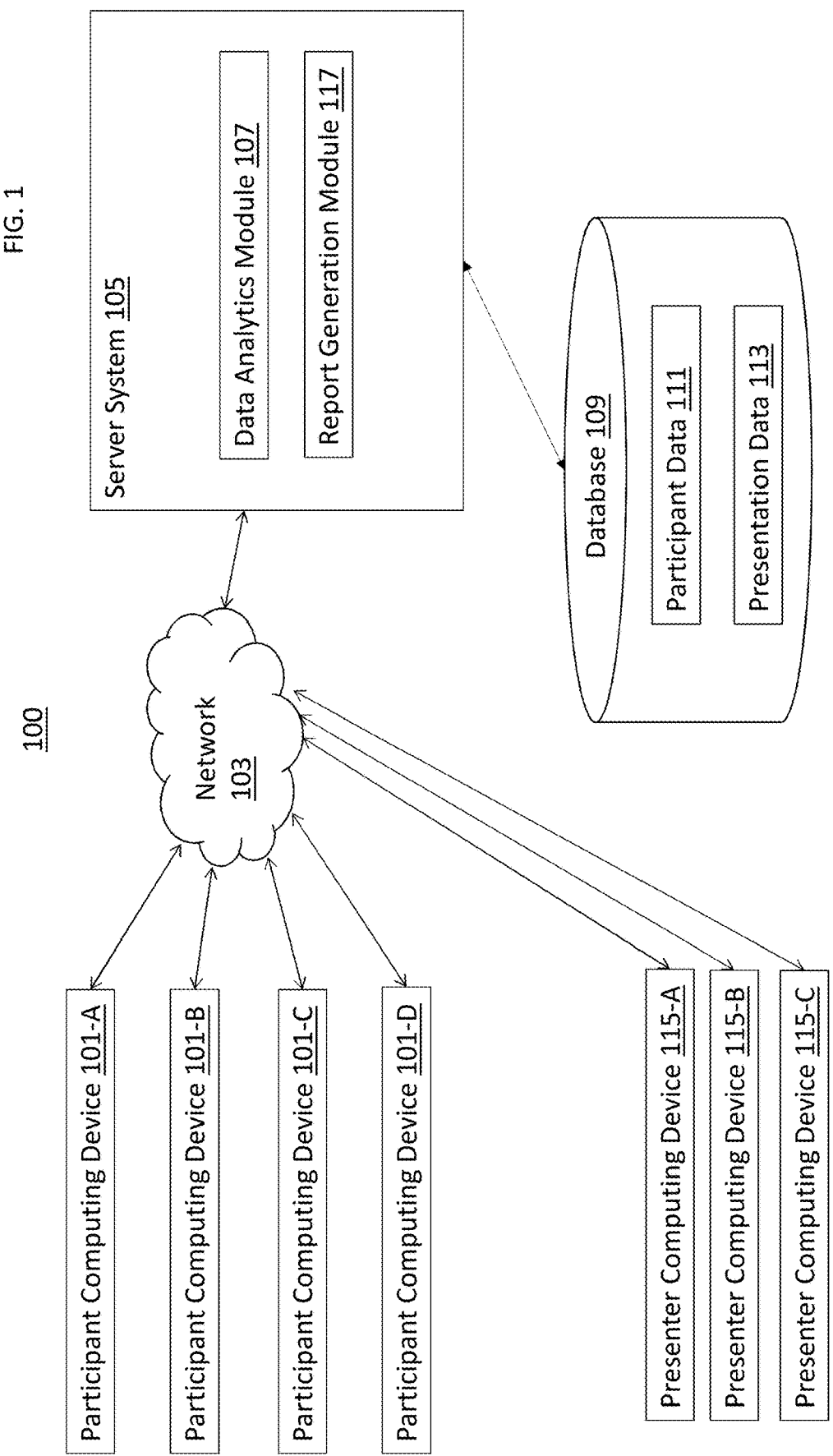
FIG. 1 illustrates a system for improved meeting engagement in accordance with some embodiments of the present disclosure.

FIG. 1 illustrates a system 100 for improved meeting engagement in accordance with an aspect of the present disclosure. A system may include one or more participant computing devices 101-A, 101-B, etc., collectively, 101, communicatively coupled to a network 103. The network 103 may also be communicatively coupled to one or more presenter computing device 115-A, 115-B, etc., collectively, 115. The network 103 may also be communicatively coupled to a server system 105 configured to include a data analytics module 107 and a report generation module 117. Further, the server system 105 may be communicatively coupled to a database 109 configured to store participant data 111 and presentation data 113.

Network 103 may include a full-service, private network configured to communicate with participant computing devices 101, presenter computing devices 115, and the server system 105. In some embodiments, network 103 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks.

In some embodiments, the participant computing devices 101 may include a desktop, laptop, cell phone, smartphone, tablet, and the like. In some embodiments, a participant may use one of the participant computing devices 101 to access a webpage, portal, form, or other application generated by the server system 105 via a user interface on the computing device 101. The user interface may be configured to display a presentation and/or related materials for the presentation to the participant. The user interface on the participant computing device 101 may be configured to receive input from a user. Example inputs include notes, saved slides, rankings, polling information, comments on the displayed slides, answers to queries presented on the user interface, and the like.

In some embodiments, the server system 105 may push one or more slides to participant devices 101 based on a command received from a presenter computing device 115. For example, the presenter may initiate a command from the presenter computing device 115, for the presentation displayed on the participant computing device 101 to move to the next slide.

Using the participant computing devices 101, a user may type in notes, save comments on a slide, navigate through a presentation, answer a question presented to the user, and/or rate a slide. This may form at least a portion of the participant data.

The presentation data may include slides associated with the presentation, timing information for when each slide is pushed to a participant computing device, polling questions, and the like.

In some embodiments, a platform built in accordance with the present disclosure may allow users to manage live meetings, engage participants across meeting types, and analyze the impact of live meetings in a single platform. In some embodiments, the participant computing device 101 may be provided by the participant in a "bring your own device" model (e.g., participant provided personal smartphone or laptop). Alternatively, or additionally, in some embodiments, the participant computing device 101 may be provided by a meeting organizer (e.g., pre-designated laptops, tablets, and the like).

In some embodiments, the server system 105 may configure an online platform that can be accessed by the participant computing device 101 and/or presenter computing device 115. In some embodiments, the online platform may be developed from a Software As A Service Application (SaaS). In some embodiments, an online platform may be configured to create and configure new live meetings, manage blocks of live meetings, upload presentations and documents to be shared during live meetings, customize live meeting experiences, review engagement meetings, run and/or moderate meetings, and synchronize participant data and presentation data.

In some embodiments, the server system 105 may receive presentation data from the presenter computing device 115. The presenter computing device 115 may generate presentation data including a time-stamp for the display of each slide within a presentation. The presentation data 113 may then be stored on a database 109 by the server system 105. The presentation data 113 may include the content displayed to participants along with a time stamp of events. For example, the presentation data 113 may include a timestamp data indicating the time at which each slide of a presentation was displayed. In some embodiments, the database 109 may store an aggregation of data from various live meetings. Live meetings may be grouped based on content, presenter, participant, and the like.

Further, in some embodiments data including participant data 111 and presentation data 113 may be stored in the database 109 in a manner capable of fast storage and retrieval. For example, only segments of participant data 111 and presentation data 113 may be stored into a reader friendly database structure that is denormalized. Additionally, the database may be configured for the fast filtering of items.

A participant computing device 101 may be configured to generate participant data for the live meeting environment. For example, in some embodiments, the participant data may include engagement data reflective of user interactions with a presentation. Engagement data may include data indicative of user clicks (e.g., total clicks, when clicked), user notes (e.g., length of notes, timing of notes), slides saved or favorited, questions asked of presenters/panels, user responses to surveys, and the like.

Participant data may also include participant feedback provided using Pre-/Post-Presentation surveys, polling questions, participant questions and participant notes. Participant data may include responses to polling questions including single, multi-select, priority-ranking, ratings, and open-response questions. The data may also include responses to survey questions indicative of participant demographics, knowledge/confidence level, experience, and feedback.

Participant engagement may be determined from participant questions and participant notes.

The participant data may be collected through the user of an application run on the participant user computing device 101. The participant data may then be transmitted to the server system 105 for storage on database 109.

Upon receipt of the participant data from the participant computing device 101 and the presentation data from the presenter computing device 115, the data analytics module 107 of the server system 105 may be configured to determine one or more key metrics for the live meeting environment based on the received participant data and/or presentation data.

In some embodiments, key metrics may indicate participant engagement levels, participant engagement level over time, how participants rate meetings, popularity of additional content, and key words. In some embodiments, the disclosed systems may involve determining engagement metrics on a slide-by-slide basis. In some embodiments, the disclosed systems may include pre- and post-intervals for all questions which enable organizers to measure shifts in learning and behavior throughout the course of their meeting. Further, the data analytics module 107 may be configured to perform statistical distributions and generate visualizations of the computed statistical distributions and the like that may then be integrated into a report by the report generation module 117.

In some embodiments, key metrics may include a total count of participants, top participants based on engagement actions, percentage of participants who engaged with a content based on their actions (e.g., saving a slide, responding to polling questions, etc.), percentage of highly engaged participants (e.g., participants who took text notes, stylus notes, submitted questions), total number of actions, actions by action types, response rates to polling questions, response rates to survey questions, percentage of correction questions, experience ratings, counts of actions over time, word cloud, engagement levels by slide, response graphs by questions, participant identification, participant profiles, and the like. In some embodiments, a participant profile may indicate what content a participant responded to, how they responded, the percentage of questions they answered correctly, and the like.

In some embodiments, determining key metrics may include mapping correlations between engagement and knowledge, demographic profiling, sentiment analysis, and benchmarking.

In some embodiments, the determined key metrics may include the percentage of participants deemed to be engaged and the percentage of participants deemed to be highly engage. The types, level, and timing of engagement data can be used to categorize participants into segments (e.g., engaged or highly engaged segments) to help group data for reporting and filtering. In some embodiments, segments may overlap. For instance, participants categorized as "Engaged" may include those found "Highly Engaged". In some embodiments, an "Engaged" participant may be a participant that at a minimum, engaged with the presentation by performing a single click. In some embodiments, a "Highly Engaged Participant" may be a participant that at a minimum, interacted with the presentation by doing more than a single click (e.g., typing a presenter question or note). In some embodiments a metric for "Engaged Percentage" may be generated by determining the number of participants that minimally interacted with the presentation by way of a single click (e.g., a single click may correspond with saving a slide) and divided by the total participants that are logged into the computing devices. Additionally, a metric for a "highly engaged percentage" may be generated by determining the number of participants that more than minimally interacted with the presentation and dividing by the total participants that logged into the devices. For example, this may include determining the number of participants that made a text note, a stylus note, a rating, a submitted presenter question, a response to survey or polling questions or an interaction with a custom button content, or the like.

Alternatively, "Engaged" and "Highly Engaged" participants may be determined by the timing of their responses/actions. For example, in some embodiments, a Highly Engaged participant may be defined as one that took actions every 5 minutes or was in the top 10% based on total number of actions. In another example, highly engaged participants may be defined as Or combinations such as answered at least 70% of survey questions and submitted a question. Based on the definitions, a calculation can be applied either in the database or in a BI Tool that can then be used for grouping and filtering data.

After categorizing participants, benchmarks can be applied to all the data by calculating average engaged percentage or average highly engaged percentage. The average percentages can be calculated based on the entire data set or subsets (client, series, type of meeting, location, etc.) thus creating benchmarks.

For example, in some embodiments the data analytics module 107 may be used to correlate and observe relationships between meeting settings and engagement, knowledge attained by participants, and the participant reported experience. The observations may then be used to generate predictive models that may suggest an ideal meeting structure. For example, key metrics may reveal that the ideal meeting design for a symposium in a particular geographical region (e.g., Eastern Europe) may have a structure that is 4 to 5 hours in total length, allows participants to view all slides (i.e., traverse forwards and backwards through a slide deck), has more frequent question and answer sessions, conducts a pre-test survey prior to the start of the meeting, leads to a higher level of participant engagement, and in turn higher knowledge transfer.

The data analytics module 107 may perform statistical analysis to determine correlative variables. Examples of statistical techniques performed by the data analytics module 107 include, but are not limited to, Chi-square automatic interaction detection (CHAID), co-variance, unsupervised clustering, Classification and Regression Tree (CART), and the like. In some embodiments, the data analytics module 107 may perform statistical techniques iteratively until a correlation between variables is determined. Data analytics module 107 may interface with statistical software tools (e.g. R, Konstanz Information Miner (KNIME)).

Demographic profiling (e.g., identifying data surrounding a participant's demographics) may be correlated with knowledge and engagement data to determine and identify any gaps in learning for a target audience. For example, knowledge and engagement data can be analyzed against a demographic (e.g., physician assistants). For example, a group of physician assistants correlated with high engagement may have met all of the learning objectives, while a second group of physician assistants that showed average engagement may have met only one learning objective. Accordingly, the modification of the presentation may include modifying the presentation to include more time such that participants may ask more questions, be more highly engaged, and thus show improved learning.

In some embodiments, the data analytics module 107 may be configured to calculate benchmarks, or engagement and experience scores across clients, meeting types, therapeutic areas, protocols, presenters, and the like. In this manner, if a particular presentation and/or meeting format continuously has lower engagement and experience scores a survey response may indicate that the presenters may not have adequate time to go through all of their content and hold a question and answer session. Accordingly, the presentation or meeting format may be modified to allow more time to the presenters along with a dedicated question and answer session in order to improve engagement along with the experience for the participants and to also improve their learning objectives scores.

In some embodiments, benchmarks may be determined for any metric by averaging the data over the entire data set or a subset thereof. For example, for a particular presentation, the average number of saved slides may be determined across each participant. A client saved slide benchmark may be determined by aggregating the quantity of saved slides for all meetings for that client and dividing by the total participants for those meetings. In some embodiments, the performance as measured by saved slides of a single meeting can be used to compare a particular meeting to the client benchmark in order to understand whether the meeting performed higher (better) or lower (worse) than benchmark. Benchmark data may be stored in a database. In some embodiments, the benchmark data may be generated and used to update previously stored benchmark data in the database. For example, data may be extracted to determine benchmarks and update the stored benchmark information at predetermined time spans (e.g. monthly, quarterly, after a specified number of meetings, etc.). Alternatively, benchmark data may be generated in real time.

In some embodiments, the server system may include a report generation module 117 further configured to modify a presentation of the live meeting environment based on the key metrics and/or provide reports to a presenter and/or organizer for the live meeting.

In some embodiments, a report may include documents that and/or raw data downloads that may be provided to a presenter and/or organizer. The report may provide a summary of engagement data. Reports may include visualizations of the slides and/or presentations a participant interacts with, key metrics, a timeline of engagement. The report may be automatically generated and presented in a downloadable format.

Reports may be provided as a part of an online platform that allows organizers and/or presenters to filter and sort presentations and their corresponding participant feedback. For example, in some embodiments the online platform may allow for the filtering and sorting of presentations by different aspects (e.g., slides with most questions, slides with most notes, slides least engaging). Reports may also indicate when participants were most engaged, which participants were most engaged, how participants rated meetings, which content was most popular and the key words of questions asked.

Reports may provide advanced analytic capabilities to an organizer, and allow for the filtering, combining, sorting, and segregation of data. Further, the reports may allow for the cross comparison across presentation and participant data from across various live meetings. Reports may include visualizations, screenshots, sortable and/or filterable metrics, a timeline of engagement statistics, and the like.

Figure 2:
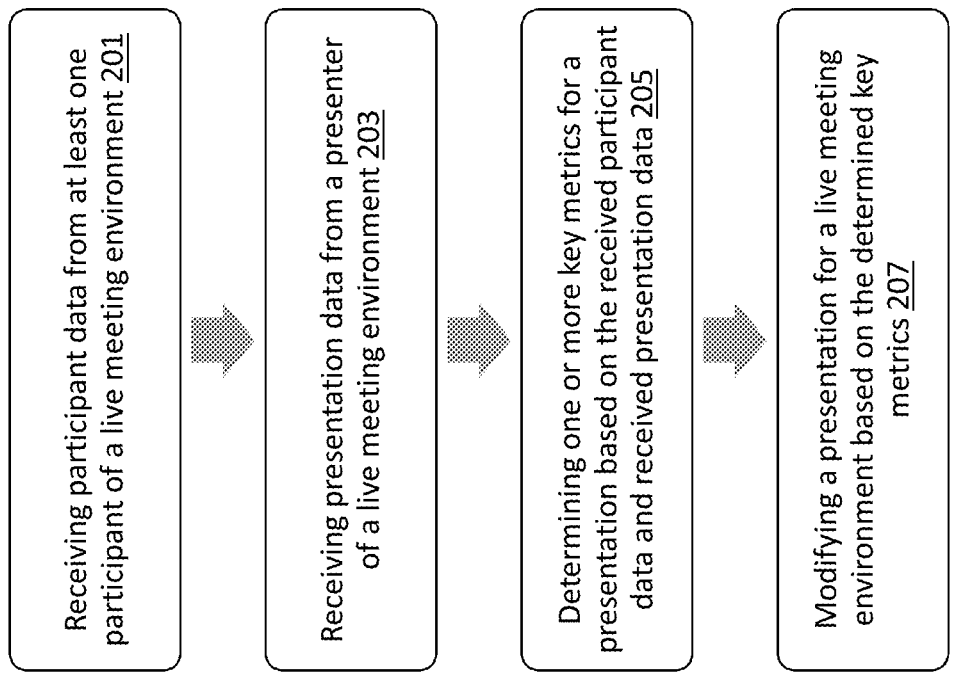
FIG. 2 illustrates a method for improved meeting engagement in accordance with some embodiments of the present disclosure.

FIG. 2 illustrates a method for improved meeting engagement in accordance with an aspect of the present disclosure. A method may include the steps of receiving participant data from at least one participant of a live meeting environment 201, receiving presentation data from a presenter of a live meeting environment 203, determining one or more key metrics for a presentation based on the received participant data and received presentation data 205, and modifying a presentation for a live meeting environment based on the determined key metrics 207.

Figure 3:
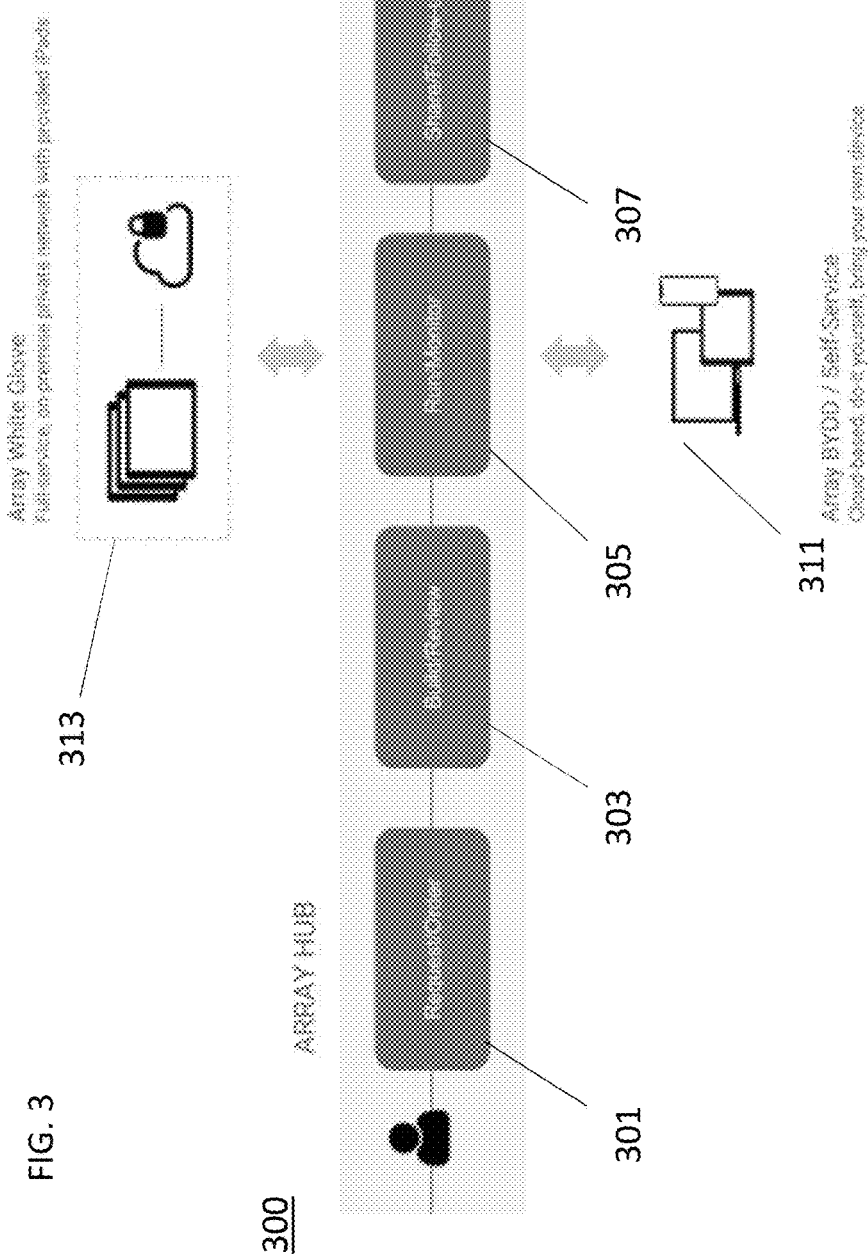
FIG. 3 illustrates a schematic diagram for a platform built in accordance with the system illustrated in FIG. 1.

FIG. 3 illustrates a schematic diagram for a platform built in accordance with the system illustrated in FIG. 1. The platform may be used by a meeting organizer to create high-engagement meeting experiences. The platform may be embodied in a SaaS environment. The platform may be configured to allow the creation and configuration of new meetings, management of blocks of meetings, uploading of presentations and documents that are to be shared during meetings, communicating with participants of the meetings, creating post-meeting content and the like.

In particular, FIG. 3 illustrates a platform 300 configured to build a live meeting environment and provide a meeting planning lifecycle via an online platform. As illustrated in FIG. 3, the platform 300 may include a request/order stage 301, a build/review stage 303, a run/monitor stage 305, a share/follow-up stage 307, and an analyze/report stage 309.

During the request/order stage 301 an organizer may request meetings, and define engagement objectives. For example, a user may request a full-service meeting that is organized by the platform 300. Alternatively, the user may request a block of meetings organized by the platform 300. In some embodiments, the platform 300 may be integrated into a Customer Relationship Management (CRM) system. Accordingly, in such an embodiment, the request/order may be automatically processed, and the appropriate stakeholders can be notified appropriately.

In the build/review stage 303 an organizer may upload assets/slides, chat and/or message with participants and/or presenters, review and edit content of slides, and the like. Uploaded documents may also include slide presentations, resource documents, survey questions, and the like. Further, during the build/review stage 303, an organizer may be able to communicate with a service provider associated with the platform 300 to streamline communication.

In the run/monitor stage 305 an organizer may download and/or synchronize a presentation to a server system and monitor live meeting metrics. During the run/monitor stage 305 the platform 300 may be configured to process and/or store the presentation data and the participant data in the relevant database.

For example, in some embodiments, an organizer may monitor the number of participants logged in, the number of live connections, counts of all the engagement metrics (number of slides saved, presenter questions, etc.), responses to polls the participants are submitting, the time spent on a slide, time since the last engagement action, the number of slides left in deck, and the like in real time. These monitored factors may also be monitored offline, or data for the monitored factors may be stored and retrieved while offline.

In the share/follow-up stage 307 an organizer may email participant notes and resources, send certificates and follow-up surveys. This may include the generation of automated emails to participants. In some embodiments, the emails may include participant notes and saved content from the meeting as well as targeted communication based on how participants engaged within the meeting. In the analyze/report stage 309 an organizer may provide data analytics and trends. In some embodiments, these may include the reports discussed above.

As illustrated in FIG. 3, in some embodiments, the system may be configured such that participants may bring their own device and access a cloud based server system 311. In other embodiments, a full-service on-premise private network may be provided with computing devices 313.

Figure 4:
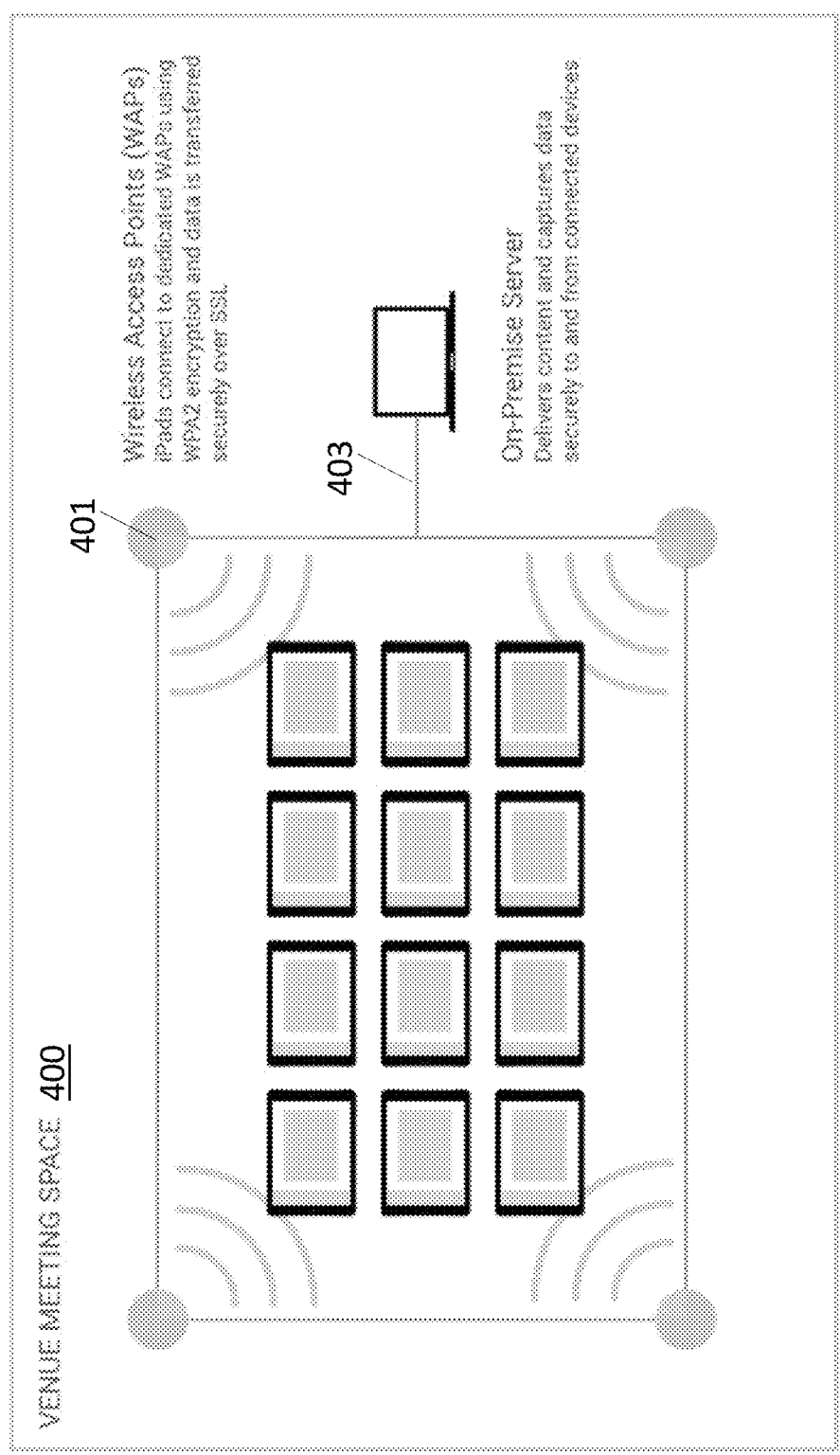
FIG. 4 illustrates a private network in accordance with some embodiments of the present disclosure.

FIG. 4 illustrates an example of a private network setup in accordance with an embodiment of the present disclosure. The private network 400 may include wireless access points 401 distributed throughout a venue meeting space and an on premise server 403. The use of a private network 400 may allow more reliable connections for the participant computing device and secure transfer of presentation and participant data.

FIGS. 5A-5D illustrate examples of reports generated by a platform in accordance with an aspect of the present disclosure.

Figure 5A:
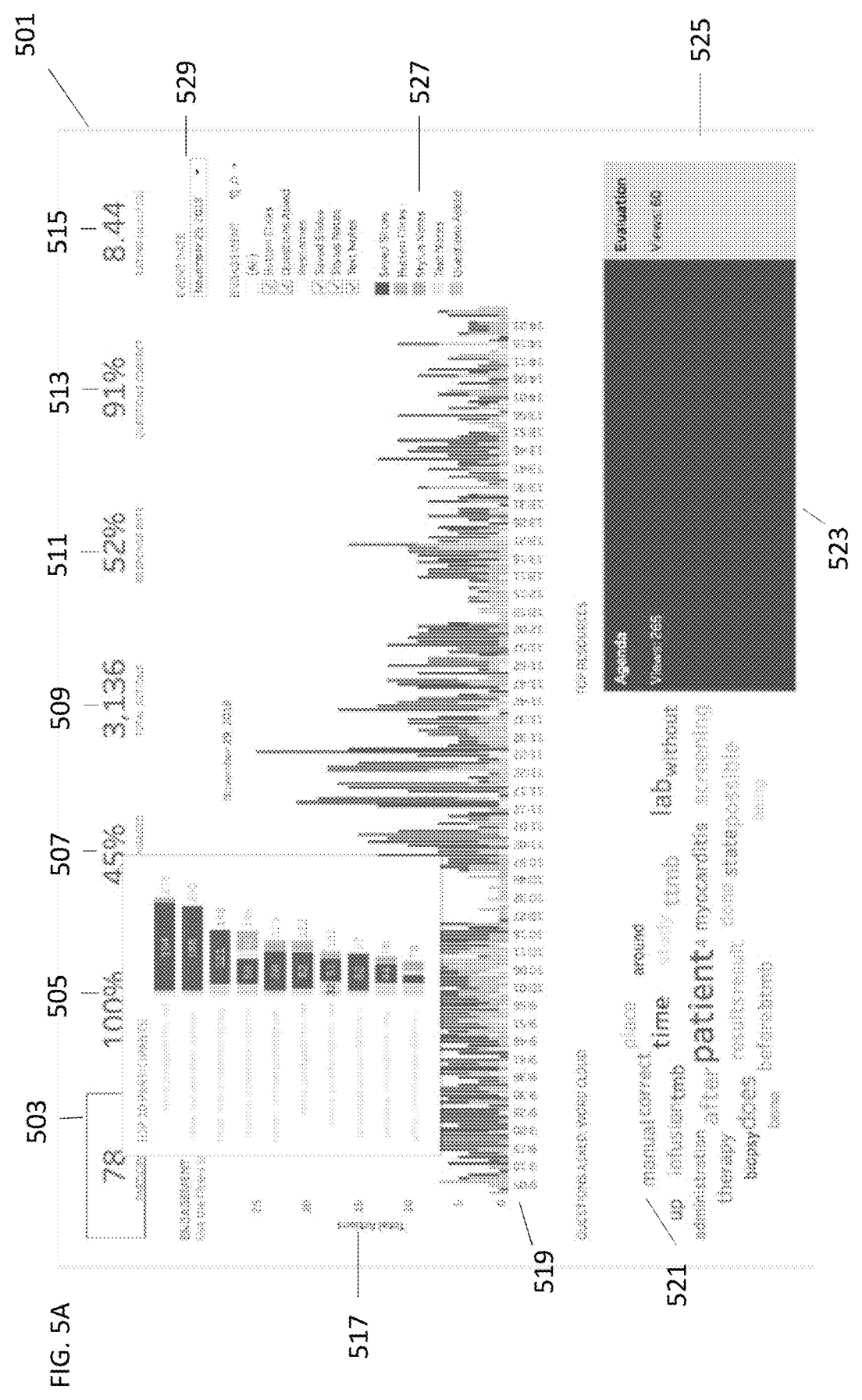

In particular, FIG. 5A illustrates a report 501 associated with a live meeting presentation including a list of top participants 503, response rates 511, questions correct 513, ratings for a presentation 515, a word cloud including key words from questions asked 521, and the like. As illustrated, each metric may be tied to the time a slide transitioned in the presentation (e.g., actions 517 over time-stamps 519). Engagement metrics 529 may also be displayed and may include button clicks, questions asked, responses, saved slides, stylus notes, text notes, and the like. For example, displayed engagement metrics 529 may include the engaged percentage 505, highly engaged percentage 507, total actions 509, button clicks—agenda 523, button clicks—views 525, a legend for an engagement timeline graph 527, and the like.

For example, as described above, the engaged percentage 505 may be generated by determining the number of participants that minimally interacted with the presentation by way of a single click (e.g., a single click may correspond with saving a slide) and divided by the total participants that are logged into the computing devices. Additionally, a metric for a highly engaged percentage 507 may be generated by determining the number of participants that more than minimally interacted with the presentation and dividing by the total participants that logged into the devices.

The total actions 509 may be indicative of all of the engagement actions for a meeting. Engagement metrics 529 may also display a response rate, which may be indicative of the total unique number of responses to each question, total questions asked, and/or total participants to the meeting. The ratings may also be displayed. In some embodiments, the ratings may be the sum of the total number of responses to an answer choice weighted by the scale for each answer choice, normalized on a 1-10 scale.

Figure 5B:
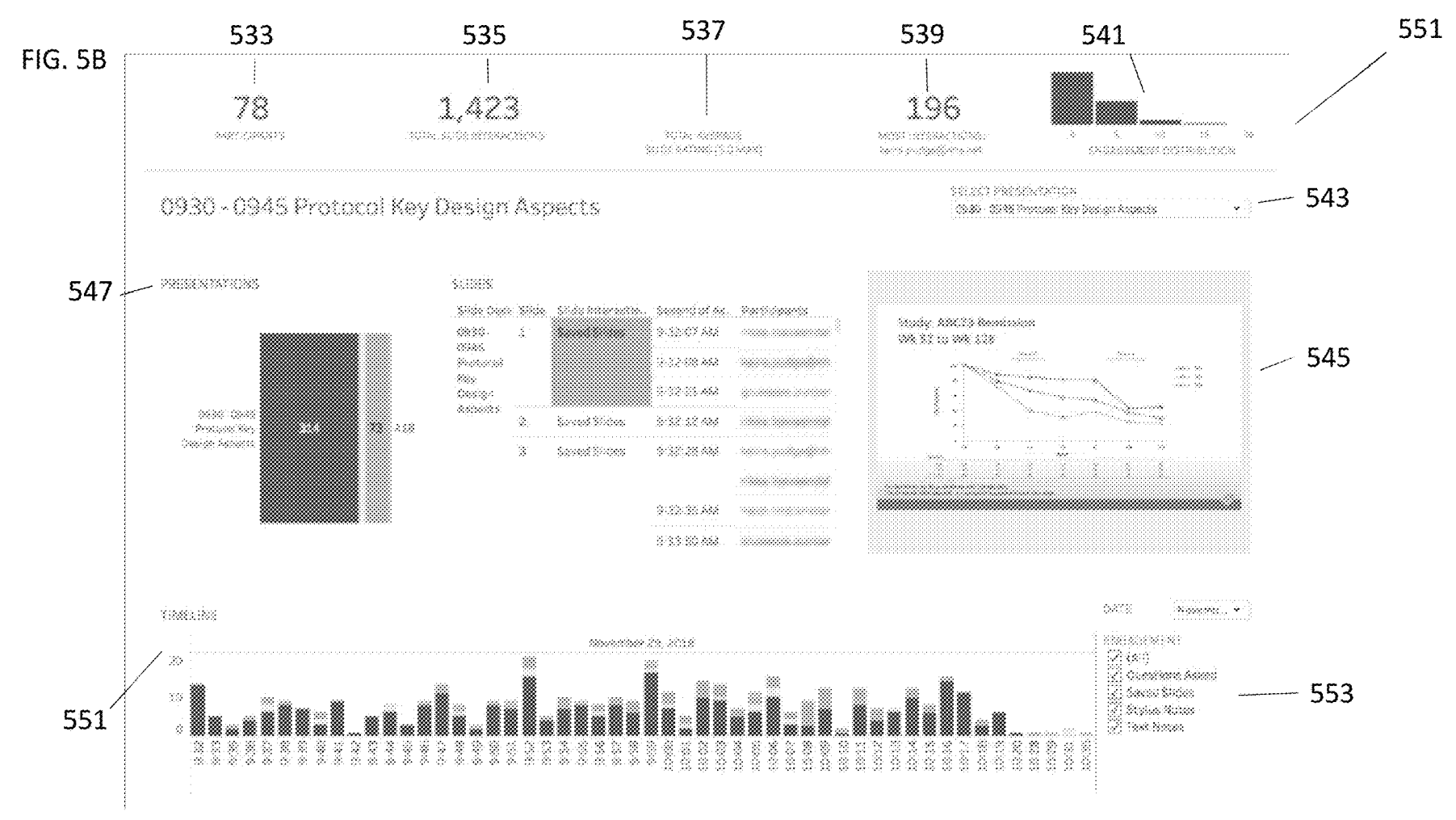

FIG. 5B illustrates a report 551 associated with a live meeting including a list of slides most saved or engaged with. As illustrated, the report may provide a protocol of key design aspects for the presentation selected 543 including, for example, the slide 545, when it was displayed, and which participants saved the displayed slide 547. Further, engagement 553 with the same presentation over time is illustrated in the timeline 551. The report 551 may also display the number of participants 533, the total slide interactions 535, the total average slide rating 537, the participant with the most interactions with the presentation 539, and a distribution of the engagement 541.

Figure 5C:
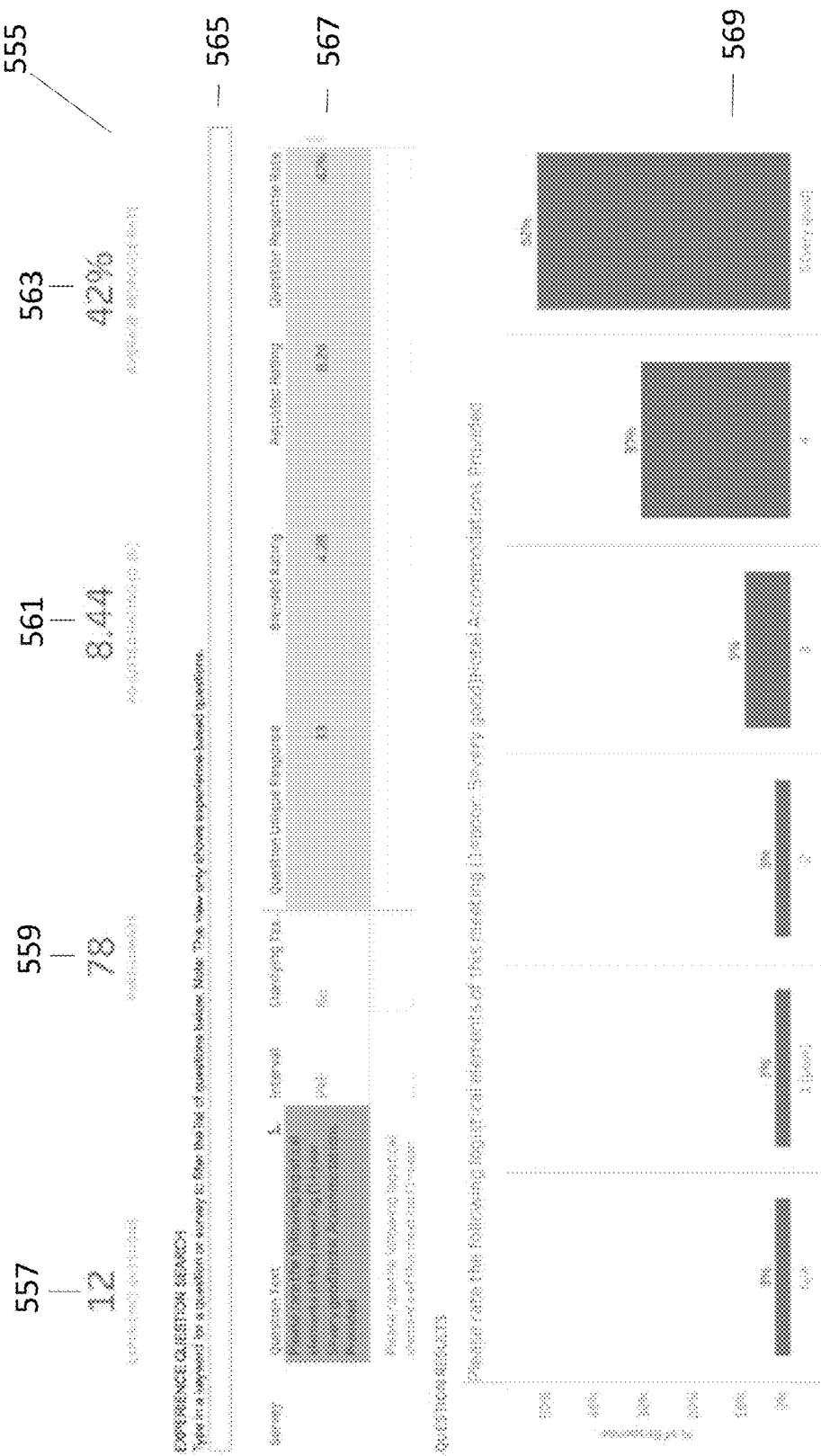
FIG. 5C illustrates a view of a platform built in accordance with some embodiments of the present disclosure.

FIG. 5C illustrates a report 555 that shows feedback and participant experience, including for example, ratings 567 provided by participants. For example, a user may rate 569 logistical elements of a meeting including hotel accommodations, transportation and the like. Further, the report may allow a user to filter a list of questions to search for an experience 565. The report 555 may include experience questions 557, participants 559, an adjusted rating 561, and an average response rate 563.

Figure 5D:
FIG. 5D illustrates a view of a platform built in accordance with some embodiments of the present disclosure.

FIG. 5D illustrates a report 571 that may be provided or organizers or other stakeholders that provides a summary 573 of engagement activity with live meetings.

Examples of data that may be displayed towards a user may include an overall meeting summary including a graphical indication of engagement levels 575. For example, the summary may display the what percentage of the participants were engaged, or highly engaged. Further, in some embodiments, the reports may include demographic characteristics (e.g., number of participants from each of cardiology, endocrinology, emergency physicians, hematology, family medicine and gastroenterology). Demographic characteristics in a medical meeting may also include a breakdown in specialty, average years of practice, and average number of patients seen per week. Further, demographic characteristics may also include geographic information, such as the region each participant is located in.

Reports may also include a summary of knowledge shift by learning objectives. In other words, survey responses and polling data may be used to determine whether a participant gained knowledge from the presentation and correlated to their engagement during the presentation.

Reports may also include a net meeting score. The net meeting score may be an indicator of the overall success of the meeting based on the participant experience (how the meeting was perceived), knowledge (how much knowledge was transferred as determined by pre-/post-results of the participants) and engagement (based on percentage of people who are highly engaged/not engaged).

For example, in some embodiments, the net meeting score may be an aggregation of individual scores for experience, knowledge and engagement at a meeting level and provide as single data point that reflects the quality of the meeting/presentation. Using a single data point may allow for an easier comparison of data across meetings.

In another example, in some embodiments, the experience score may be determined based on the Net Promotor Score™ (NPS). The Net Promotor Score (−100 to 100) is determined based on asking a specific question and collecting data on a 0-10 scale. Experience score can also be calculated based on other rating scales (1-5 or 1-6) and a different calculation can be applied such as number of rating that are 5's and 6's minus number of ratings that are 1's and 2's.

In some embodiments, the knowledge score may be determined based on categorizing participants as "unaffected", "reinforced", or "improved" for each question asked that has a correct answer. In some embodiments, participants may be asked questions pre- and post-presentation. Accordingly, the knowledge score may be determined by adding the percentage of improved and reinforced and subtracting the percentage unaffected, thus creating a score between −100 and 100. In some embodiments, an unaffected score may correspond to a wrong answer to a question pre- and post-presentation, a reinforced score may correspond to a right answer to a question pre- and post-presentation, and an improved score may correspond to a wrong answer to a question pre-presentation followed by a right answer to a question post-presentation.

Accordingly, in some examples, the Net Meeting Score can be the sum of the NPS, Net Knowledge Score and Net Engagement Score. For example, the Net Meeting score may be a number between −300 and 300.

The reports may also include an engagement timeline 577 that illustrates engagement with a presentation over time.

The key metrics described in relation to FIGS. 5A-5D allow for the aggregation of data not only at the meeting level, but also across meetings, and over time. Additionally, the presentation data may also for the filtering of data at various levels. For example, key metrics can be changed by filtering by other data, such as displaying the percent correct for a specific question split by responses to a demographic question like location, role, and the like. In this way key metrics can be altered to meet the needs of the presenter and can change based on the objectives of the meeting. Metrics can be aggregated, filtered, split, excluded, displayed over time, compared against benchmarks, etc. as well as viewed at a single participant level, slide image level, presentation, etc. Accordingly, systems and methods in accordance with the present disclosure may allow the viewing of data at different levels and groupings.

Embodiments built in accordance with the present disclosure may also include systems configured to intelligently identify areas of improvement and provide suggestions for modifications to existing presentations by utilizing artificial intelligence methods. Such system may be configured to apply artificial intelligence to key metrics, combinations of metrics, and patterns to provide summaries and suggestions for areas of presentation improvement. For example, in some embodiments, natural language processing, sentiment analysis, and topic modeling may be used to review the ratings and reviews for each meeting's evaluations and generate data. Based on the generated data, the system can automatically determine which sessions or areas are underperforming and provide alerts to the client. Additionally, some systems may be used to analyze data across a plurality of meetings in order to identify patterns across meetings such as a specific presenter on a specific topic may be under performing compared to another presenter. For example, such a system may be configured to review the comments across a plurality of meetings, flag "negative" comments and identify that a particular presenter was ineffective because he or she was speaking too fast.

Modifications to the presentation may be based upon reviewing the determined key metrics for each slide. For example, by reviewing the top slides with most actions and/or engagement, a presenter may determine that the slides with the most important content did not resonate with the participants and therefore review and update the indicated slides. In some embodiments, the system may provide a list of slides most likely to require revisions. In another example, a presenter may determine, based on the slide with most questions submitted with it, that more detail is required for a slide. In another example, after reviewing the notes associated with a particular slide, the presenter may determine that the format (i.e., highlight, bolding), or order of content on the slide requires updating.

Modifications to presentations may also be made by reviewing responses to polling questions. For example, if the responses to the polling questions indicate that the participant did not understand the content related to the polling question, the presenter may create new slides, change the existing slides, or the like. Alternatively, the presenter may be presented with contact information for the participant, such that the presenter can follow-up with the participant who asked the question.

Modifications may also be based on the absence of data. For example, slides that elicit no or minimal engagement may be removed, re-ordered or edited as appropriate.

Figure 6:
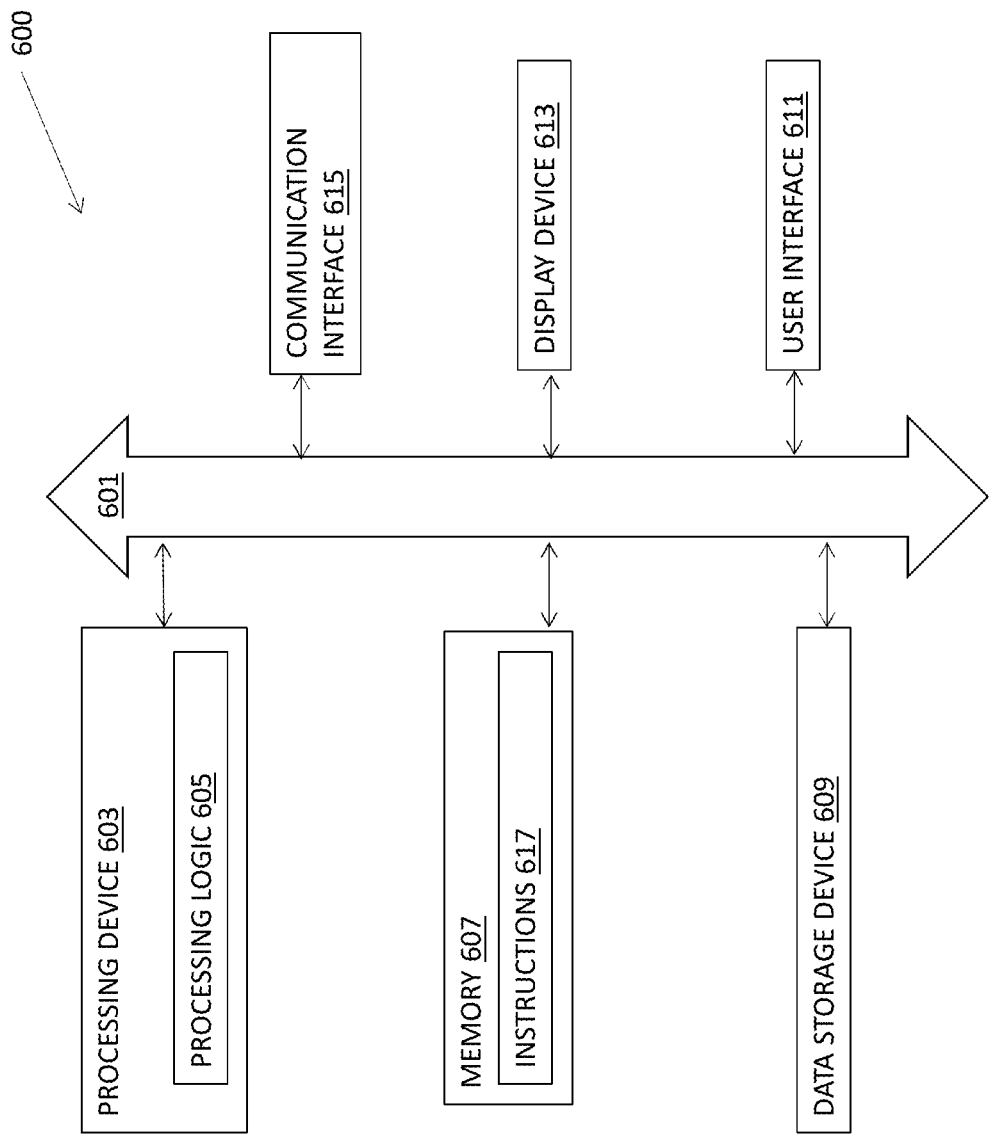
FIG. 6 illustrates a computer system in accordance with some embodiments of the present disclosure.

FIG. 6 illustrates a computer system in accordance with some embodiments of the present disclosure.

FIG. 6 illustrates a functional block diagram of a machine in the example form of computer system 600, within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, each of the participant computing device 101, presenter computing device 115 and the server system 105 of FIG. 1 may be implemented by the example machine shown in FIG. 6 (or a combination of two or more of such machines).

Example computer system 600 may include processing device 603, memory 607, data storage device 609 and communication interface 615, which may communicate with each other via data and control bus 601. In some examples, computer system 600 may also include display device 613 and/or user interface 611.

Processing device 603 may include, without being limited to, a microprocessor, a central processing unit, an application specific integrated circuit (ASIC), a field programmable gate array (FPGA), a digital signal processor (DSP) and/or a network processor. Processing device 603 may be configured to execute processing logic 605 for performing the operations described herein. In general, processing device 603 may include any suitable special-purpose processing device specially programmed with processing logic 605 to perform the operations described herein.

Memory 607 may include, for example, without being limited to, at least one of a read-only memory (ROM), a random access memory (RAM), a flash memory, a dynamic RAM (DRAM) and a static RAM (SRAM), storing computer-readable instructions 617 executable by processing device 603. In general, memory 607 may include any suitable non-transitory computer readable storage medium storing computer-readable instructions 617 executable by processing device 603 for performing the operations described herein. Although one memory device 607 is illustrated in FIG. 6, in some examples, computer system 600 may include two or more memory devices (e.g., dynamic memory and static memory).

Computer system 600 may include communication interface device 611, for direct communication with other computers (including wired and/or wireless communication), and/or for communication with network 103 (see FIG. 1). In some examples, computer system 600 may include display device 613 (e.g., a liquid crystal display (LCD), a touch sensitive display, etc.). In some examples, computer system 600 may include user interface 611 (e.g., an alphanumeric input device, a cursor control device, etc.).

In some examples, computer system 600 may include data storage device 609 storing instructions (e.g., software) for performing any one or more of the functions described herein. Data storage device 609 may include any suitable non-transitory computer-readable storage medium, including, without being limited to, solid-state memories, optical media and magnetic media.

In some embodiments, a live meeting technology engagement platform may serve as a hub for users to access a variety of engagement systems to measure the effectiveness of their live meetings. The system may engage audiences through configured software options and then send metrics to a server including an analytics module for analysis purposes.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, soft ware, Software applications or code) include machine instructions for a programmable processor, and may be implemented in a high-level procedural and/or object-oriented programming language, and/or in assembly/machine language. As used herein, the terms "machine-readable medium' "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or frontend components. The components of the system may be interconnected by any form or medium of digital data communication (e.g., a communication network). Examples of communication networks include a local area network ("LAN"), a wide area network ("WAN"), and the Internet. The computing system may include clients and servers. A client and server are generally remote from each other and typically interact through a communication network. The relationship of client and server arises by virtue of computer programs running on the respective computers and having a client-server relationship to each other. A number of embodiments have been described. Nevertheless, it will be understood that various modifications may be made without departing from the spirit and scope of the invention. For example, much of this document has been described with respect to television advertisements, but other forms of future, viewership-based advertisements may also be addressed. Such as radio advertisements and on-line video advertisements. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Although the present disclosure may provide a sequence of steps, it is understood that in some embodiments, additional steps may be added, described steps may be omitted, and the like. Additionally, the described sequence of steps may be performed in any suitable order.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments.

We claim:

1. A system comprising:
    a presenter computing device configured to display a first presentation and generate presentation data, wherein said first presentation comprises electronically delivered content;
    one or more participant computing devices configured to generate participant data comprising participant device activity data indicative of participant interactions with the displayed first presentation, wherein the participant data includes responses to questions that test knowledge attained by participants; and
    a server system, associated with an electronic platform, comprising one or more processors and a memory that includes instructions, that when executed by the one or more processors, causes the one or more processors to:
    receive participant data from the one or more participant computing devices communicatively coupled to an electronic platform, wherein the electronic platform is configured to support a live meeting environment;
    receive presentation data from the presenter computing device communicatively coupled to the electronic platform;
    categorize participants based on the participant data, wherein each participant is assigned to a knowledge category of unaffected, reinforced, or improved;
    determine a knowledge score by adding a percentage of participants categorized as improved and reinforced, and subtracting the percentage of participants categorized as unaffected;
    determine, by the server system, a key metric for the live meeting environment based on the received participant data and received presentation data;
    automatically generate an interactive report based on the knowledge score and key metric; and
    modifying, by the server system:
        the electronic platform to display the interactive report; and
        a second presentation on the electronic platform based on the key metric.

2. The system of claim 1 wherein the participant data comprises at least one of participant engagement data, and participant feedback.

3. The system of claim 1, wherein the presentation data comprises at least one of slides associated with the presentation, timing information for when each slide is pushed to a participant computing device, and polling questions.

4. The system of claim 1, wherein the key metric comprises at least one of participant engagement levels, participant engagement over time, meeting ratings, popularity of content, key words, total count of participants, top participants based on engagement levels, percentage of participants who engaged with content, percentage of highly engaged participants, total number of actions, actions by action types, response rates to polling questions, response rates to survey questions, percentage of correction questions, experience ratings, counts of actions over time, word cloud, engagement levels by slide, response graphs by questions, participant identification, and participant profiles.

5. The system of claim 4, wherein a participant profile comprises at least one of a participant demographic, an indication of the content a participant responded to, or the percentage of questions the participant answered correctly.

6. The system of claim 1, wherein the modification to the second presentation of the live meeting environment comprises altering at least one of slide formatting, slide order, slide content, presentation order, and presentation content.

7. A method comprising:

receiving, at a server system associated with an electronic platform, participant data from one or more participant computing devices communicatively coupled to the electronic platform, wherein the electronic platform is configured to support a live meeting environment and the participant data includes participant device activity indicative of at least participant interactions with a first presentation, wherein the participant data includes responses to questions that test knowledge attained by participants;

receiving, at the server system, presentation data from a presenter computing device communicatively coupled to the electronic platform, wherein said presentation data is responsive to electronically delivered content;

categorize participants based on the participant data, wherein each participant is assigned to a knowledge category of unaffected, reinforced, or improved;

determining a knowledge score by adding a percentage of participants categorized as improved and reinforced, and subtracting the percentage of participants categorized as unaffected;

determining, by the server system, one or more key metrics for the live meeting environment based on the received participant data and received presentation data, wherein the key metrics comprise a determined correlation between participant engagement and at least one of participant sentiment, participant experience, and knowledge;

automatically generate an interactive report based on the knowledge score and key metrics; and modifying, by the server system:
the electronic platform to display the interactive report; and
a second presentation mediated by the electronic platform, based on the key metrics.

8. The method of claim 7 wherein the participant data comprises at least one of participant engagement data, and participant feedback.

9. The method of claim 7, wherein the presentation data comprises at least one of slides associated with the presentation, timing information for when each slide is pushed to a participant computing device, and polling questions.

10. The method of claim 7, wherein the key metric comprises at least one of participant engagement levels, participant engagement over time, meeting ratings, popularity of content, key words, total count of participants, top participants based on engagement levels, percentage of participants who engaged with content, percentage of highly engaged participants, total number of actions, actions by action types, response rates to polling questions, response rates to survey questions, percentage of correction questions, experience ratings, counts of actions over time, word cloud, engagement levels by slide, response graphs by questions, participant identification, and participant profiles.

11. The method of claim 10, wherein a participant profile comprises at least one of a participant demographic, an indication of the content a participant responded to, or the percentage of questions the participant answered correctly.

12. The method of claim 7, wherein modifying the presentation of the live meeting environment comprises altering at least one of slide formatting, slide order, slide content, presentation order, and presentation content.

13. The method of claim 7, wherein determining one or more key metrics for the live meeting environment comprises determining from participant data: one or more key metrics for a particular slide, determining one or more key metrics across a collection of slides, and comparing at least one of the determined key metrics for a particular slide, and key metrics for across a collection of slides.

14. A computer program product for improving live meeting engagement, the computer program product comprising computer-readable media having computer-readable code, the computer program product comprising the following computer-readable program code for effecting actions in a computing platform:

program code for receiving, via a server system associated with an electronic platform, participant data from one or more participant computing devices communicatively coupled to the electronic platform, wherein the electronic platform is configured to support a live meeting environment and the participant data includes participant device activity data indicative of at least participant interactions with a first presentation, wherein the participant data includes responses to questions that test knowledge attained by participants;

program code for receiving, via the server system, presentation data from a presenter computing device communicatively coupled to the electronic platform;

program code for categorizing participants based on the participant data, wherein each participant is assigned to a knowledge category of unaffected, reinforced, or improved;

program code for determining a knowledge score by adding a percentage of participants categorized as improved and reinforced, and subtracting the percentage of participants categorized as unaffected;

program code for determining, via the server system, a key metric for the live meeting environment based on at least one of the received participant data and the received presentation data;

program code for automatically generate an interactive report based on the knowledge score and the key metric; and program code for modifying by the server system:
the electronic platform to display the interactive report; and
a second presentation mediated by the electronic platform, based on the key metric, wherein said second presentation comprises electronically delivered content.

15. The computer program code of claim 14 wherein the participant data comprises at least one of participant engagement data, and participant feedback.

16. The computer program code of claim 14, wherein the presentation data comprises at least one of slides associated with the presentation, timing information for when each slide is pushed to a participant computing device, and polling questions.

17. The computer program code of claim 14, wherein the key metric comprises at least one of participant engagement levels, participant engagement over time, meeting ratings, popularity of content, key words, total count of participants, top participants based on engagement levels, percentage of participants who engaged with content, percentage of highly engaged participants, total number of actions, actions by action types, response rates to polling questions, response rates to survey questions, percentage of correction questions, experience ratings, counts of actions over time, word cloud, engagement levels by slide, response graphs by questions, participant identification, and participant profiles.

18. The computer program code of claim 14, wherein a participant profile comprises at least one of a participant demographic, an indication of the content a participant responded to, or a percentage of questions the participant answered correctly.

19. The computer program code of claim 14, further comprising program code for modifying the presentation of the live meeting environment by altering at least one of slide formatting, slide order, slide content, presentation order, and presentation content.

20. The computer program code of claim 14, wherein determining one or more key metrics for the live meeting environment further comprises, determining from participant data: one or more key metrics for a particular slide, determining one or more key metrics across a collection of slides, and comparing at least one of the determined key metrics for a particular slide, and key metrics for across a collection of slides, with a benchmark.

* * * * *